United States Patent

[11] 3,586,347

| [72] | Inventors | William R. Carey<br>Farmington;<br>David P. Hass, Detroit, both of, Mich. |
|---|---|---|
| [21] | Appl. No. | 830,837 |
| [22] | Filed | June 5, 1969<br>Division of Ser. No. 661,598, Aug. 18, 1969, Patent No. 3,473,824 |
| [45] | Patented | June 22, 1971 |
| [73] | Assignee | Eaton Yale & Towne Inc.<br>Cleveland, Ohio |

[54] SAFETY DEVICE
5 Claims, 9 Drawing Figs.

[52] U.S. Cl. .................................................. 280/150
[51] Int. Cl. ...................................................... B60r 21/10
[50] Field of Search .......................................... 280/150;
206/19.5, DIG. 30

[56] References Cited
UNITED STATES PATENTS
2,834,606  5/1958  Bertrand ........................ 280/150

| 3,429,583 | 2/1969 | Martin et al. ................ | 280/150 |
| 3,450,414 | 10/1966 | Kobori ......................... | 280/150 |
| 2,418,798 | 4/1947 | Whitmer ...................... | 244/121 |

FOREIGN PATENTS
953,312  3/1964  Great Britain ................  280/150

*Primary Examiner*—Kenneth H. Betts
*Attorney*—Yount and Tarolli

ABSTRACT: A safety device comprises an inflatable confinement. The inflatable confinement has a contracted position and an expanded position and is inflated to its expanded position by the flow of fluid into the confinement. The kinetic energy of the initial fluid flow into the confinement is absorbed by energy-absorbing means. The absorption of the initial kinetic energy of the fluid flowing into the confinement minimizes the impact of the fluid on a forward portion of the confinement, and thus minimizes the impact of the confinement against an occupant of the vehicle during the initial stages of the inflation of the confinement.

PATENTED JUN 22 1971

INVENTORS
WILLIAM R. CAREY
DAVID P. HASS

BY *Young and Tarolli*

ATTORNEYS

INVENTORS
WILLIAM R. CAREY
DAVID P. HASS

BY Yount and Tarolli
ATTORNEYS 3,586,347

SAFETY DEVICE

This application is a divisional application of Ser. No. 661,598, filed Aug. 18, 1967, now U.S. Pat. No. 3,473,824, and assigned to the same assignee.

The present invention relates to a safety device, and particularly relates to a safety device having a contracted condition and an expanded condition and when in its expanded condition, operates to restrain movement of the occupant of a vehicle during a collision.

Inflatable confinements for controlling movement of an occupant of a vehicle during a collision are known. Such a confinement is shown in application Ser. No. 562,289, now U.S. Pat. No. 3,414,292, assigned to the assignee of the present invention. In such an inflatable confinement, the initial flow of the fluid into the confinement causes the confinement to be rapidly expanded relative to the occupant of the vehicle and, in some circumstances, a forward portion of the confinement may strike the occupant thereby causing injury to the occupant.

The principal object of the present invention is the provision of a new and improved confinement which alleviates the above-noted problem and which is constructed so as to minimize the possibility of a forceful impact of a portion of the confinement with an occupant of the vehicle during the initial stages of the inflation of the confinement.

An important object of the present invention is the provision of a new and improved safety device which comprises an inflatable confinement and which is inflated by the flow of fluid into the confinement, and means for absorbing the kinetic energy of the initial flow of fluid into the confinement.

A further object of the present invention is the provision of a new and improved safety device comprising an inflatable confinement and which is inflated by a flow of fluid into the confinement, and wherein a member is located within the confinement and has a surface portion against which the initial flow of fluid into the confinement impinges.

A still further object of the present invention is the provision of a new and improved safety device comprising a confinement which has a contracted condition and an expanded condition and which is actuated to its expanded condition by a flow of fluid into the confinement, and wherein the confinement includes means for limiting the amount of movement of a forward portion of the confinement relative to the occupant of the vehicle to thereby minimize the possibility of impact of a portion of the confinement on the occupant during a collision.

Still another object of the present invention is the provision of a new and improved safety device comprising an inflatable confinement having a chamber defined by wall means, and wherein burstable means divides the chamber into at least two chamber portions and bursts upon a predetermined pressure in one chamber to provide for flow of fluid from the one chamber into the other chamber.

A still further object of the present invention is the provision of a new and improved safety device, as noted in the next preceding object, wherein the burstable means comprises a flexible member located in the confinement and preferably constituting an inner container located within the inflatable confinement.

Another object of the present invention is the provision of a new and improved safety device for protecting an occupant of the vehicle from impact with a structural part of the vehicle, such as the steering wheel of the vehicle, and wherein the safety device is generally L-shaped so that upon inflation one leg portion of the confinement projects between the occupant of the vehicle and the structural part of the vehicle.

Further objects and advantages of the present invention will be apparent to those skilled in the art to which it relates from the following detailed description of preferred embodiments thereof made with reference to the accompanying drawing forming a part of this specification and in which.

The present invention relates to safety devices which may be employed in various types of vehicles including automobiles, trucks, airplanes, and the like. For purposes of illustration, a safety device is herein shown and described as being utilized in an automobile 10.

Figure 1:
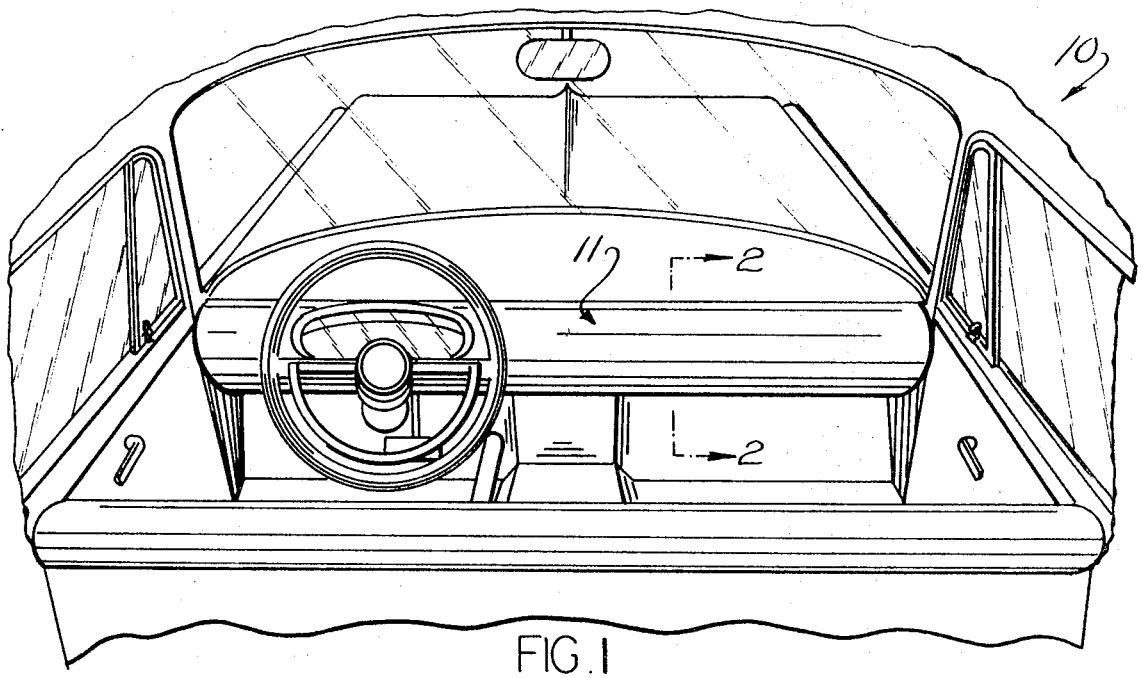
FIG. 1 illustrates a perspective view of a portion of an automotive vehicle embodying the present invention.
Figure 2:
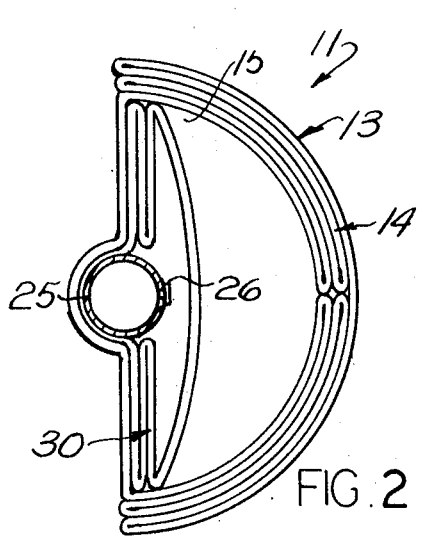
FIG. 2 is a cross-sectional view taken approximately along the section line 2-2 of FIG. 1.
Figure 3:
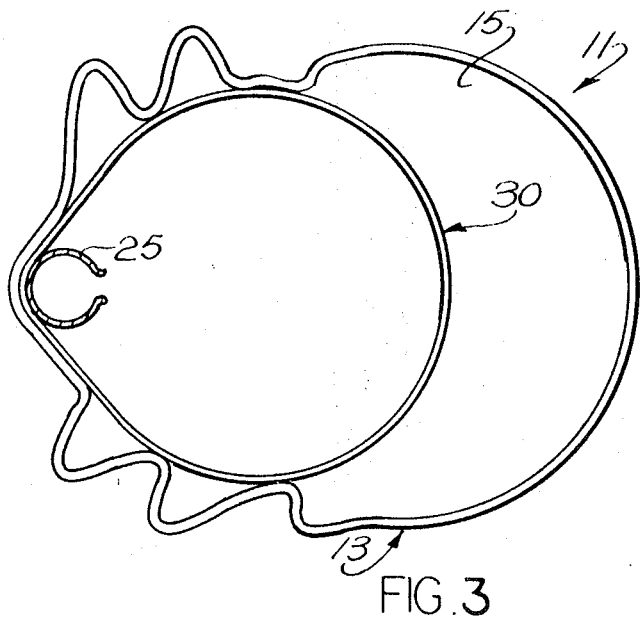
FIGS. 3 and 4 are somewhat schematic sectional views of the safety device shown in FIG. 2 in different operative conditions.
Figure 4:
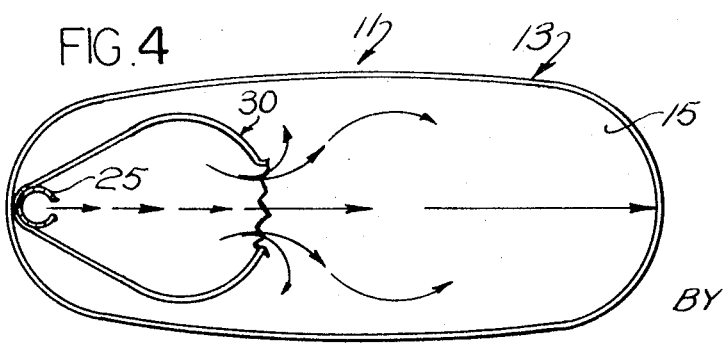

The automobile 10 includes a safety device 11 as illustrated in FIGS. 2—4 and which includes an inflatable confinement 13. The inflatable confinement 13 has a contracted or inoperative position illustrated in FIG. 2 and an expanded or operative position illustrated in FIG. 4. The inflatable confinement 13 is also provided with wall means 14 made of a suitable material which defines a chamber 15. The flow of fluid into the chamber 15 results in inflation or expansion of the confinement 13. The confinement 13 is expanded upon the vehicle encountering a collision condition and when expanded restrains movement of an occupant of the vehicle as a result of the collision.

The walls means 14 of the confinement 13, when the confinement 13 is in the position shown in FIG. 2, may be folded and located in the dash of the vehicle. While the safety device 11 is illustrated as associated with the dash of the vehicle, it should be understood that the safety device 11 could be located in the back of the front seat of the vehicle, in a door, or in any location in the vehicle.

The safety device 11 is expanded from its contracted condition to its expanded condition by the flow of a fluid into the chamber 15. In this connection, a reservoir 25 of fluid is associated with the confinement 13. The reservoir 25 is located immediately adjacent the confinement, but could be remote therefrom. As illustrated, the supply of fluid has an explosive 26 associated therewith which, when ignited, opens the reservoir 25 and releases fluid therefrom for flow into the confinement 13. The explosive 26 is ignited in any suitable manner, such as by operation of a sensor which operates in response to the vehicle encountering a collision condition. The flow of fluid is illustrated as being directly into the confinement but alternatively could be otherwise, such as a reverse flow where the flow would be initially in the direction opposite that shown.

As the fluid flows from the reservoir 25, it flows, as shown in FIG. 3, against a member in the form of an inner container 30, located with the confinement 13. The inner container 30 has a contracted position, shown in FIG. 2, in which the walls thereof are folded within the chamber 15. The explosive 26 is illustrated schematically and should be associated with the container 30 so that an opening is not formed in the container 30 upon ignition of the explosive 26. The inner container 30 is made of a suitable material which may be folded and expanded by fluid flow into the inner container 30. The material of the inner container 30 bursts upon a predetermined pressure therein.

The initial flow of fluid into the inner container 30 causes the inner container 30 to expand, as shown in FIG. 3 and, at the same time, may cause some movement of the confinement 13 relative to the occupant of the vehicle. As the pressure of the fluid increases in the inner container 30, the inner container 30 bursts due to the pressure of the fluid causing an opening to be formed therein, as shown in FIG. 4, and the fluid then flows from the inner container 30. The flow of fluid from the inner container 30 results in a complete expansion of the confinement 13. Since the initial flow of fluid impinges against the interior wall surface of the inner container 30, the inner container 30 absorbs much of the kinetic energy of the initial flow of fluid. As a result, the initial flow of fluid does not impinge against a wall portion of the confinement 13 and thus minimizes the possibility of a forceful impact of a portion of the confinement 13 against an occupant of the vehicle. The function of absorbing the initial kinetic energy of the fluid flow could be performed by the inner container 30 if rather than being burstable, as illustrated, the walls of the inner container 30 were provided with passages therein through which fluid could flow and the initial fluid flow was directed into the inner container 30.

As noted above, the initial flow of fluid from the reservoir 25 into the inner container 30 may result in some movement of the confinement, as illustrated in FIG. 3. However, the amount of movement of the confinement which results due to the initial flow of fluid into the inner container 30 is limited by the inner container 30. In the event that the inner container 30 was absent from the chamber 15, the initial flow of fluid would be directed against a wall portion of the confinement 13, and the confinement 13 would be moved relative to the occupant by the initial flow of fluid into the confinement 13. This movement of the confinement 13 would be to an extended position, such as illustrated in FIG. 4. However, in view of the fact that the initial flow of fluid impacts or impinges against the wall surface of the inner container 30, the confinement is thus limited in its movement by the initial flow of fluid into the confinement 13, as illustrated in FIG. 3. From the above, it should be apparent that the inner container 30 not only functions to absorb the initial kinetic energy of the fluid flow into the confinement 13, but also limits the distance that the initial flow of fluid into the confinement 13 moves a portion of the confinement.

Figure 5:
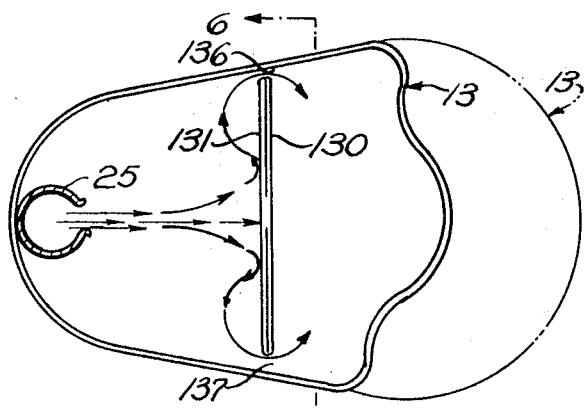
FIG. 5 is a schematic view illustrating a modification of the safety device shown in FIG. 2.
Figure 6:
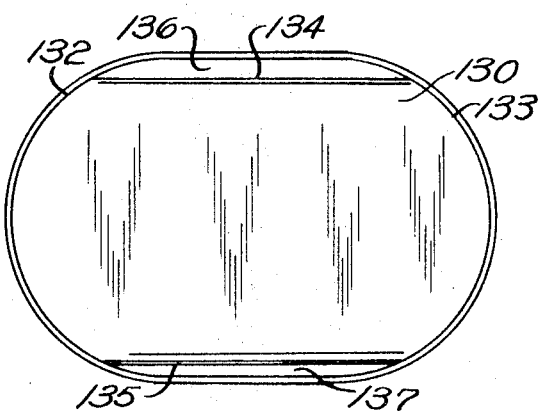
FIG. 6 is a view taken along the line 6-6 of FIG. 5.

FIGS. 5 and 6 illustrate a modified embodiment of the present invention in which, rather than the burstable inner container 30, a baffle member 130 is provided in the confinement 13. The baffle member 130 is located in a position so that the initial flow of fluid into the confinement 13 is directed so as to impact against a surface 131 of the baffle member 130.

The baffle member 130 has opposite end portions 132, 133 which are connected with opposite wall portions of the confinement 13. Moreover, as shown in FIG. 6, the upper and lower edge portions 134, 135, respectively, of the baffle member 130 terminate short of the adjacent wall of the confinement 13 and thereby provide fluid passageways 136, 137, respectively, for effecting flow of fluid past the baffle 130 into the portion of the chamber 15 of the confinement 13 which is beyond the baffle member 130. Moreover, the baffle member 130 may be provided with openings or passageways therein in order to effect the desired amount of fluid flow into the portion of the chamber 15 of the confinement beyond the baffle 130.

The baffle member 130 functions in a manner similar to the inner container 30 defined in detail hereinabove with reference to FIGS. 1—4. More specifically, since the initial flow of fluid into the confinement 13 impinges against the surface 131 of the baffle 130, the baffle 130 functions to absorb at least a portion of the kinetic energy of the initial fluid flow into the confinement 13 and thereby minimizes the possibility of a forceful impact of the confinement 13 with an occupant of the vehicle. Moreover, the baffle member 130 functions to limit the distance through which the confinement 13 would be moved by the initial flow of fluid into the confinement 13. As illustrated in FIG. 5, in full lines, the initial flow of fluid into the confinement 13 results in the right-hand portion of the chamber 15 in the confinement 13 not being fully inflated by the initial flow of fluid into the confinement 13. In the event, however, that the baffle member 130 was removed, the confinement 13 would be expanded to a position such as shown in dotted lines in FIG. 5. Thus, the baffle member 130, as does the inner container 30, functions to limit the distance that the initial flow of fluid into the confinement 13 moves a portion of the confinement 13.

Figure 7:
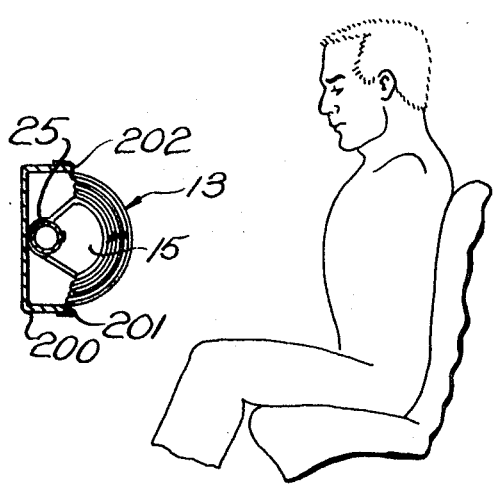
FIGS. 7 and 8 are schematic views illustrating a still further modification of a safety device embodying the present invention.
Figure 8:
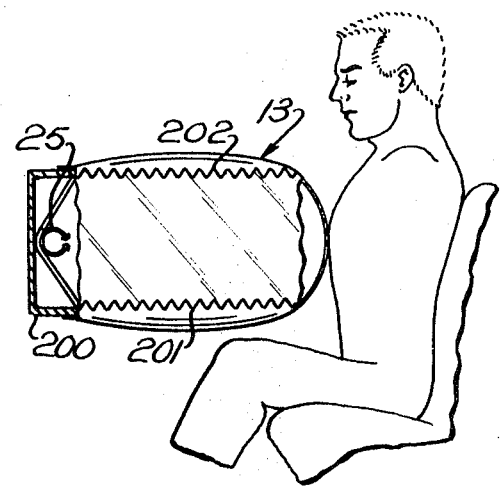

FIGS. 7 and 8 illustrate a still further modified embodiment of the present invention in which an inflatable confinement 13 is provided with means for absorbing the initial kinetic energy of the flow of fluid into the confinement 13 in which the means limits the amount of movement of a portion of the confinement 13 by the initial flow of fluid. In the embodiment illustrated schematically in FIGS. 7 and 8, an inflatable confinement 13 is mounted in association with the dashboard of the vehicle, and is shown in a contracted condition in FIG. 7 and in an expanded condition in FIG. 8.

The inflatable confinement 13 is associated with the dashboard of the vehicle when the confinement is in its contracted condition. The confinement 13 is carried by a support member 200 which may comprise any suitable support in the vehicle, and as illustrated, constitutes a support for the dashboard. The reservoir 25 of fluid is released and fluid flows into the chamber 15 of the confinement 13. The flow of fluid into the chamber 15 of the confinement 13 causes the confinement 13 to inflate and take the position illustrated in FIG. 8. When the confinement 13 is expanded into the position shown in FIG. 8, the confinement 13 is located adjacent the occupant of the vehicle so as to receive the impact of movement of the occupant during the collision. The confinement 13 operates to control the movement of the occupant of the vehicle during the collision.

The safety device illustrated in FIGS. 7 and 8 also includes means for absorbing the initial kinetic energy of the fluid flow into the confinement 13 and to limit the movement of a portion of the confinement 13 by the initial flow of fluid into the confinement 13. This means is illustrated schematically in FIGS. 7 and 8 as comprising restraining members 201, 202 which extend from the support 200 to the forward portion of the confinement 13. The restraining members 201, 202 are attached at one end to the support 200 and at the other end to the confinement 13. The restraining members 201, 202 may comprise resilient members which effectively bias the confinement 13 toward the support 200, and thus the flow of fluid into the confinement 13 must overcome the force applied by the restraining members 201, 202 to effect expansion of the confinement 13. Thus, the restraining members 201, 202 may function to absorb a part of the kinetic energy of the fluid flow into the confinement 13. Moreover, the restraining members 201, 202 likewise limit the amount of movement of the forward portion of the confinement 13 relative to the occupant of the vehicle due to the initial flow of fluid into the confinement 13. The restraining members 201, 202, while illustrated schematically as being resilient tapes, other structures, such as a net or possibly even a rigid structure, could be utilized for restraining the movement of the confinement 13 by the initial flow of fluid into the container 30.

Figure 9:
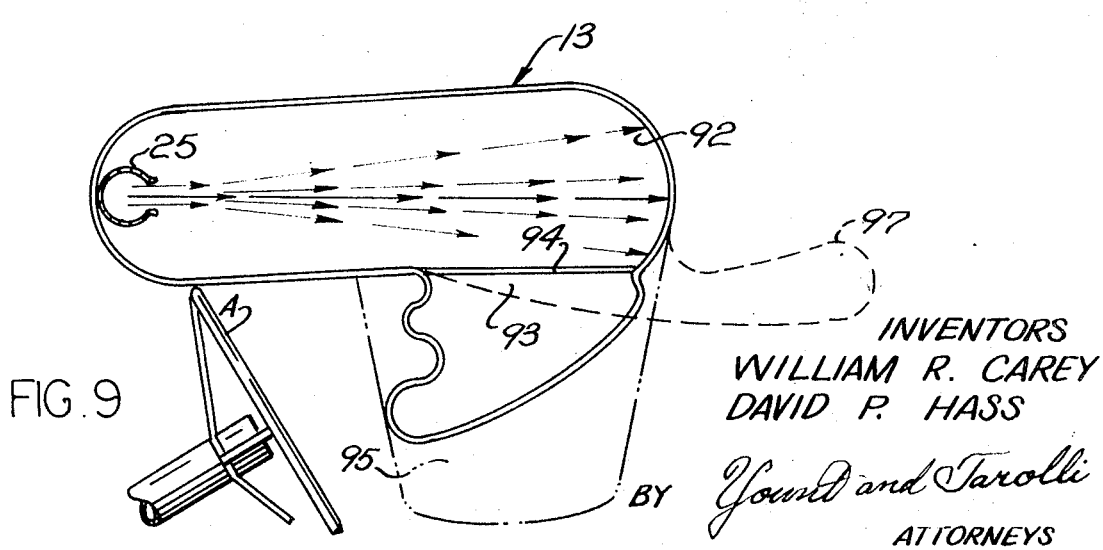
FIG. 9 is a view of still another safety device embodying the present invention.

The safety device 11 of FIG. 9 comprises the inflatable confinement 13 having the fluid reservoir 25. The inflatable confinement 13, as illustrated, includes a first chamber portion 92 into which the fluid initially flows from the reservoir 25. The confinement 13 includes a second chamber portion 93 which is separated from the chamber portion 92 by a partition member 94. The partition member 94 is relatively weak in construction and bursts upon a predetermined pressure being established in the chamber 92, and upon bursting provides for flow of fluid from the first chamber 92 into the second chamber 93. The dot-dash line 95 shows the formation of the confinement 13 upon complete inflation of the confinement 13 and bursting of the portion 94. The confinement 13, of course, functions to control or restrain the movement of the occupant of a vehicle during a collision, as described.

In the event that the portion 94 of the confinement 13 was eliminated, the portion 93 of the confinement would be extended outwardly by the initial flow of fluid somewhat into the position illustrated and designated 97 in FIG. 9. Such movement, of course, would result in the portion 97 possibly striking an occupant of the vehicle. As a result, it should be apparent that the portion 94 functions to limit the outward movement of the portion of the confinement forming the second chamber 93 and prevents it from taking the position illustrated and designated 97. As a result, the burstable partition member 94 comprises means for limiting the distance that a portion of the confinement 13 moves due to the initial flow of fluid into the confinement 13.

The confinement 13, as illustrated in FIG. 9, has a generally L-shaped configuration when inflated. The chamber 92 forms one leg of the L-shape and the chamber 93 forms the other leg of the L-shape. As described above, the confinement 13 is inflated in a manner wherein the chamber 92 is inflated first and then subsequently, the chamber 93 is inflated. As a result of this manner of inflation of the confinement 13, the confinement may be readily utilized for protecting an occupant from forceful impact with a projecting portion of the vehicle, such as a steering wheel of the vehicle.

As illustrated in FIG. 9, the steering wheel A of the vehicle is located so that the chamber 92 of the confinement 13 is inflated in a position above the steering wheel A and the chamber 93 of the confinement 13 then inflates between the steering wheel A and the occupant of the vehicle. As a result, the confinement operates to restrain the movement of an occupant of the vehicle into engagement with the steering wheel A of the vehicle.

Having described our invention, we claim:

1. A vehicle safety device for protecting an occupant of a vehicle during an accident comprising an expandable confinement having a contracted condition and an expanded condition, said confinement in its unrestricted expanded condition having a first portion for projecting between the occupant of the vehicle and a structural part of the vehicle and a second portion for connection with the vehicle and to extend from the vehicle to a position beyond said structural part of the vehicle, a source of fluid, and means providing for fluid flow from said source of fluid to effect expansion of said confinement without interference from said structural part, and said second portion of said confinement being inflated prior to said first portion of said confinement.

2. A vehicle safety device as defined in claim 1 wherein said first and second portions of said confinement are separated by a burstable partition member, said partition member bursting upon a predetermined pressure being created in said second portion of said confinement.

3. A vehicle safety device as defined in claim 1 wherein said confinement when expanded has a generally L-shaped configuration.

4. A vehicle safety device for protecting an occupant of a vehicle during an accident comprising an expandable confinement having a contracted condition having a first portion for projecting between the occupant of the vehicle and a first structural portion of the vehicle which is located forwardly of the occupant, said confinement when expanded also having a second portion for connection with a second structural portion of the vehicle which is located forwardly of the occupant and spaced from the occupant a distance greater than the first structural portion, said second portion of said confinement having an extent to extend from said second structural portion and terminating adjacent said first structural portion when expanded, a fluid source, means providing for fluid flow from said fluid source to effect expansion of said confinement so that said second portion of the confinement extends from the second structural portion to adjacent said first structural portion and said first portion of the confinement extends between the occupant and said first structural portion.

5. The vehicle safety device of claim 4 wherein the first structural portion is the vehicle steering wheel and the second structural portion is the dashboard of the vehicle, and said confinement when expanded has a generally L-shaped configuration.

UNITED STATES PATENT OFFICE
CERTIFICATE OF CORRECTION

Patent No. 3,586,347　　　　　Dated June 22, 1971

Inventor(s) William R. Carey and David P. Hass

It is certified that error appears in the above-identified patent and that said Letters Patent are hereby corrected as shown below:

Column 6, line 13, after "condition" insert -- and an expanded condition, said confinement when in its expanded condition --

Signed and sealed this 2nd day of November 1971.

(SEAL)
Attest:

EDWARD M. FLETCHER, JR.　　ROBERT GOTTSCHALK
Attesting Officer　　　　　　Acting Commissioner of Patents